(12) United States Patent
Gibson et al.

(10) Patent No.: US 8,559,096 B2
(45) Date of Patent: Oct. 15, 2013

(54) REFLECTIVE DISPLAY PIXEL

(75) Inventors: Gary Gibson, Palo Alto, CA (US); Stephen Kitson, Alveston (GB); Adrian Geisow, Portishead (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/260,227

(22) PCT Filed: Jun. 18, 2009

(86) PCT No.: PCT/US2009/047761
§ 371 (c)(1),
(2), (4) Date: Nov. 8, 2011

(87) PCT Pub. No.: WO2010/147586
PCT Pub. Date: Dec. 23, 2010

(65) Prior Publication Data
US 2012/0038972 A1 Feb. 16, 2012

(51) Int. Cl.
*G02B 26/00* (2006.01)
*G09G 3/34* (2006.01)

(52) U.S. Cl.
USPC ............. 359/296; 359/228; 345/107; 345/76; 349/25

(58) Field of Classification Search
USPC ................. 359/296, 452, 228, 245, 247, 315; 345/55, 76, 83, 84, 105, 107, 204, 207, 345/208; 313/45, 498, 504–512; 349/25, 349/33, 123, 129, 163
See application file for complete search history.

(56) References Cited

U.S. PATENT DOCUMENTS

| 6,219,170 | B1 * | 4/2001 | Kimura et al. | 359/248 |
| 7,190,417 | B2 * | 3/2007 | Harada et al. | 349/25 |
| 7,570,310 | B2 * | 8/2009 | Harada et al. | 349/25 |
| 7,889,414 | B2 * | 2/2011 | Ikeda | 359/267 |
| 7,889,420 | B2 * | 2/2011 | Gibson | 359/296 |
| 8,319,724 | B2 * | 11/2012 | Wang et al. | 345/107 |
| 2002/0171619 | A1 | 11/2002 | Gordon | |
| 2006/0232731 | A1 | 10/2006 | Sikharulidze | |
| 2008/0030832 | A1 | 2/2008 | Paolini | |

FOREIGN PATENT DOCUMENTS

JP 2001083551 3/2001

OTHER PUBLICATIONS

Korean Intellectual Property Office, International Search Report for PCT/US2009/047761 dated Mar. 2, 2010 (11 pages).
English Document (Machine Translation) pertaining to JP-2001-083551 from patent.lexis.com, printed on Dec. 6, 2011 (7 pages).

* cited by examiner

Primary Examiner — Loha Ben

(57) ABSTRACT

Various reflective display pixels are provided. In one embodiment, among others, a reflective display pixel for modulating the return of incident visible light is provided that includes one or more stacked cells. Each cell includes a fluid containing a light absorbing medium capable of absorbing incident light in at least one specified wavelength band for that cell and a light returning medium capable of selectively returning at least a portion of the light within the specified wavelength band for that cell. In other embodiments, each cell includes a fluid containing a light absorbing medium capable of absorbing incident light in at least one specified wavelength band for that cell and a light returning medium capable of selectively returning at least a portion of visible light outside the specified wavelength band for that cell.

14 Claims, 3 Drawing Sheets

REFLECTIVE DISPLAY PIXEL

BACKGROUND

A reflective display is a non-emissive device in which ambient light is used for viewing the displayed information. Rather than modulating light from an internal source, desired portions of the incident light spectrum are reflected from the display back to a viewer. Reflective displays include arrays of pixels that control the reflection of light back to the viewer.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Electronic paper (e-paper) technologies have evolved to provide single layer monochromatic displays that control the reflection of ambient light. For example, reflective display pixels employing front-to-back electrophoretic motion of white titanium dioxide ($TiO_2$) particles in a colored fluid have been used. Because these pixels do not allow for stacking, a range of colors may be achieved only through use of filters over N sub-pixels in a side-by-side arrangement, with each sub-pixel modulating a different color band. However, in this case, less than 1/N of the incident light can be utilized in each color band, resulting in an adverse affect on the brightness of the reflective display.

Figure 1:
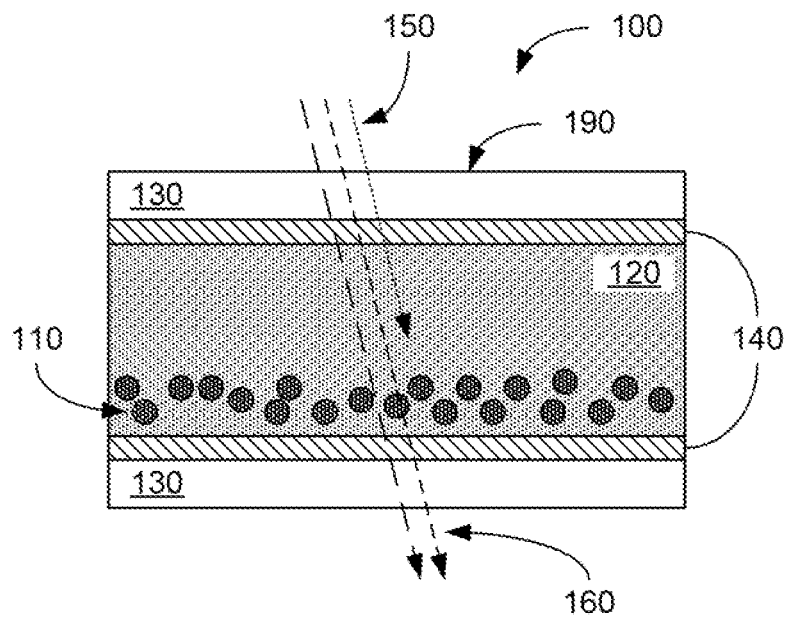
FIG. 1 is a graphical representation of a cell of a reflective display pixel according to an embodiment of the present invention.

FIG. 1 is a graphical representation of a cell 100 of a reflective display pixel according to an embodiment of the present invention. A cell 100 includes a fluid containing a light absorbing medium and a light returning medium. The light absorbing medium absorbs incident light within one or more specified wavelength bands, but is transparent at other wavelengths. For example, in one embodiment, the specified wavelength band includes blue light. In other embodiments, the specified wavelength band may include green or red light. The light absorbing medium is transparent to at least a portion of visible light outside the specified band, allowing wavelengths to be substantially transmitted through the pixel cell 100. In some embodiments, the absorbance is strong enough that essentially all light within the specified wavelength band is absorbed within the thickness of the cell 100 if not returned by the light returning medium. In one embodiment, among others, a specified wavelength band includes sub-bands. The sub-bands may overlap, be contiguous, or be noncontiguous. The fluid of a cell 100 may be substantially transparent to all wavelengths of light or to at least a portion of the wavelengths outside the specified band of that cell 100.

In the embodiment of FIG. 1, the fluid is colored by a light absorbing medium that absorbs light within the specified wavelength band. The absorption may be provided by colorants such as, but not limited to, pigments and dyes in the fluid. The colored fluid 120 may not be actively controlled in the cell 100. In other embodiments, the light absorbing medium includes light absorbing particles such as, but not limited to, pigment particles and plasmonic particles. The light absorbing particles may be suspended in the fluid and, in some embodiments, may be controllable within the pixel cell 100. In some embodiments, various combinations of particles and/or colorants may be used as the light absorbing medium.

The pixel cell 100 also includes light returning medium in the fluid. In the embodiment of FIG. 1, the light returning medium is a plurality of light returning particles 110 adapted to selectively return one or more wavelengths of light within the specified wavelength band(s). In some embodiments, these particles 110 are reflective particles adapted to reflect light with a spectrum that matches the absorption spectrum of the light absorbing medium. In other embodiments, only a portion of the absorption spectrum is returned. Reflection can include, but is not limited to, diffractive and scattering effects. In one embodiment, among others, both polarizations of light are returned by the light returning medium.

Examples of light returning particles can include, but are not limited to, metallic or composite metallic-dielectric particles that support localized plasmon resonances. Localized plasmon resonances are collective oscillations of conduction electrons that can couple strongly to light. Noble metals such as silver (Ag) and gold (Au) typically provide strong plasmon resonances. Plasmonic structures can also be engineered to strongly scatter light at desired optical wavelengths while being essentially transparent at other wavelengths. For example, the scattering cross-section for isolated spherical metal particles increases in proportion to the 6th power of their radius ($r^6$), whereas their absorption cross-section depends on the 3rd power of their radius ($r^3$). Hence, spherical silver or gold particles with diameters greater than about 60 nm primarily scatter light without much absorption. The scattering can also be weighted toward back-scattering through proper design of the particles. For example, simple spherical silver particles in the range of 100 nm diameter back-scatter significantly more light than they forward scatter.

Alternatively, reflective particles can be optically scattering plasmonic core-shell particles consisting of dielectric cores with metal shells, or metal cores with dielectric shells. Tailoring the dimensions and material properties, such as dielectric properties and metal band structure, of composite structures of the core and shells allows tuning of the wavelength position and width of their plasmonic scattering resonances. By varying the dimensions and material properties, plasmonic particles can be adapted to return or absorb light within a specified wavelength band.

Figure 4:
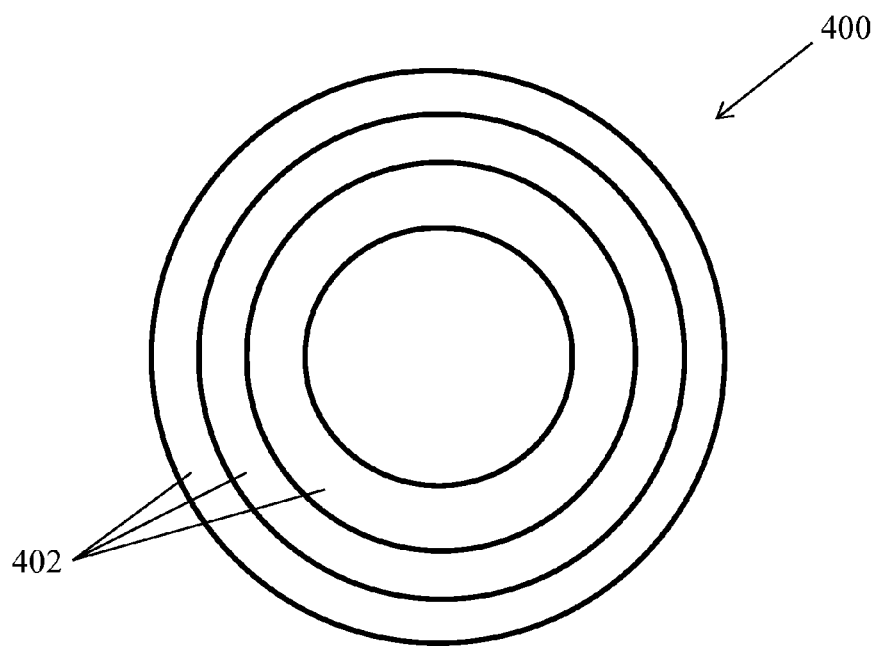
FIG. 4 is a schematic diagram of Bragg scattering particle having layers of materials.

In another embodiment, Bragg scattering particles based on tailored layers or concentric shells may be used as light returning particles. Bragg scattering particles can be made from alternating layers of materials with a different refractive index. The layer thicknesses are set to be a quarter wave thickness of the layer material. Coatings can be applied to spherical particles (such as particle 400 in FIG. 4) to form concentric shells (or layers 402) of different refractive indices so that they reflect light incident from all directions. Such Bragg scattering particles give a wavelength selective reflection determined by the thicknesses of the layers and the difference in refractive index between the layers. For example, examples of Bragg scattering particles are described in "Electromagnetic eigenoscillations and fields in a dielectric microsphere with multilayer spherical stack", G. Burlak, et al., Optics Communications, vol. 187, pp. 91-105 (2001).

Other types of nanoparticles can be used as light returning particles 110. In one embodiment, among others, cholesteric flake particles operate to selectively scatter wavelengths by comprising multi-layered dielectric structure with a helical variation in the director orientation. This results in a helical variation in optical constants with depth which, depending on pitch and handedness, enables the reflection of light within a selected wavelength band and with a given handedness of circular polarization. To reflect both circular polarizations, composite particles may be used that include a right handed twist on a portion of the particle and a left handed twist on the rest of the particle. Alternatively, both right-handed and left-handed particles can be utilized. A disadvantage of such structures is that the color reflected does depend on the incident angle so that the particles would have to be aligned or oriented. In contrast, control of the orientation of spherical particles, as described above, is not needed.

Cholesteric flakes are described in "Progress in the development of polymer cholesteric liquid crystal flakes for display applications", T. Z. Kosc et al., Displays, vol. 25, no. 5, pp. 171-176 (2004). They are made from cholesteric liquid crystal materials which can be UV cured to form polymers.

Other light returning particles 110 can include structured nanoparticles such as, but not limited to, rod shaped particles with concentric layers and composite metallic/dielectric particles where cavity resonances are used to generate the colors. Diffractive structures within the particles may also be used to generate the colors. Ideally, scattering particles are designed to primarily back-scatter the light to the viewer, rather than forward scattering the light into the light absorbing medium. This may be accomplished through design of the size and shape of the particles.

At least one of the light absorbing medium and the light returning medium of a pixel cell 100 can be controllably positioned to control the amount of light returned within the at least one specified wavelength band for that cell 100. In one embodiment, the pixel cell 100 is an electrophoretic cell with transparent substrates 130 and transparent electrodes 140 separated by a fluid containing the light returning particles 110 and/or the light absorbing particles. In other embodiments, the pixel cell 100 utilizes dielectrophoretic motion or motion that depends, at least in part, on electrohydrodynamic effects.

Figure 2:
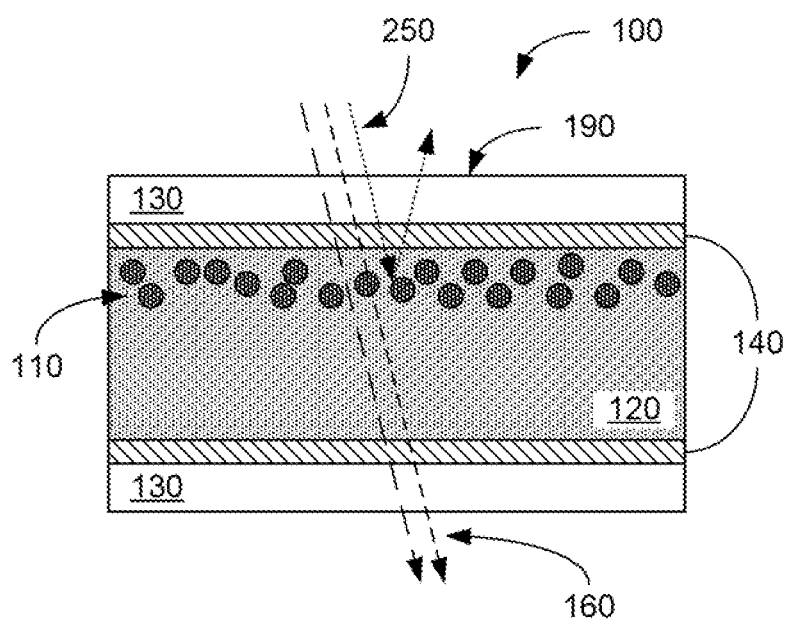
FIG. 2 is a graphical representation of the cell of FIG. 1 returning incident light according to an embodiment of the present invention.

In the embodiment of FIG. 1, the position of the light returning particles 110 within the pixel cell 100 is controllable. For example, in an electrophoretic cell, the light returning particles 110 can be charged particles with a zeta potential sufficient to move them electrophoretically across the cell 100 by means of an electric field provided by the electrodes 140. Alternatively, as illustrated in FIGS. 1 and 2, position of the particles may be controlled toward or away from a viewing surface 190 of the pixel cell 100. In other embodiments, dielectrophoretic motion or motion that depends, at least in part, on electrohydrodynamic effects may be used for control. Alternatively, magnetic control or microfluidic control may be utilized.

The operation of an exemplary pixel cell 100 including a plurality of light returning particles 110 can be explained with respect to FIGS. 1 and 2. In FIG. 1, the light returning particles 110 (e.g., reflective particles) are in a fluid containing a light absorbing medium 120 such as, but not limited to, a dye that is capable of absorbing light within at least one specified wavelength band. When the light returning particles 110 are moved away from the viewing surface 190 of the cell (as illustrated in FIG. 1), most or all of the incident light 150 at wavelengths within the specified wavelength band is absorbed by the colored fluid 120. In contrast, light 160 having wavelengths in at least a portion outside the specified wavelength band are substantially transmitted through the pixel cell 100. For example, in one embodiment, the light absorption medium contained in the fluid is capable of absorbing blue light, whereas green and red light pass through the colored fluid 120, as well as the light returning particles 110. When the light returning particles 110 are moved toward the viewing surface 190 (as illustrated in FIG. 2), light 250 at wavelengths within the specified wavelength band that reaches the particles 110 is returned toward the viewer while light 160 outside the specified wavelength band continues to pass through the pixel cell 100. By controlling the position of the light returning particles 110 within the fluid, the amount of returned light 250 can be controlled.

In the case of reflective particles, even without asymmetric back-scattering at each particle, scattering from multiple particles can result in a majority of the light within the specified wavelength band being reflected out of the display and back to the viewer if the mean free path for scattering is small compared to the absorption length in the fluid containing the light absorbing medium 120. A short mean free path for scattering can be achieved by increasing the density of the particles 110 near the viewing surface 190. For plasmonic particles, the useful packing density can be limited by the distance at which the particles begin to interact with each other, thereby shifting their resonance and/or exhibiting additional plasmonic modes. Typically, this begins to occur at particle separations comparable to the particle dimensions. In some embodiments, the packing density of the reflective particles can be controlled via a combination of repulsive forces produced by particle charge, steric hindrance produced by ligands or oligomers attached to the particles, or encapsulation by, for example but not limited to, polymers, dendrimers, ligands, and oligomers. These factors can also aid in preventing permanent agglomeration of the particles.

In the exemplary embodiments of FIGS. 1 and 2, the position of the light returning particles 110 are controlled by moving the particles 110 toward or away from the viewing surface 190 of the pixel cell 100. Alternatively, cell architectures can be used where the particles 110 are moved within the cell in the plane of the display. In this case, the particles are "hidden" in a small part of the cell area when one wants to absorb light in the cell's fluid. In some embodiments, the particles 110 can either be swept into the viewed area below or behind the viewing surface 190 or concentrated into small areas and potentially hidden under opaque regions such as a busbar of the transparent electrodes 140. If out-of-plane motion is employed, as in FIGS. 1 and 2, then the distances over which the particles must be moved are only on the order of the absorption depth of the absorbing fluid. Thus, only micron scale motions are required, enabling fast response times. In some embodiments, control of the orientation of the nanoparticles may also be desirable to control the angular distribution of the scattering and/or diffraction of the incident light. In one embodiment, electric dipoles are used to control the nanoparticle orientation.

As discussed above, in some embodiments, the light absorption medium may be provided by light absorbing particles that absorb light within the specified wavelength band that are suspended in a transparent fluid within the pixel cell 100. In one embodiment, among others, the light returning particles 110 and the light absorbing particles are oppositely charged. Depending on the sign of the electrical bias applied to the cell 100, either the light absorbing or light returning particles can be moved toward the viewing surface 190 of the cell 100, while the oppositely charged particle is moved away from the viewing surface 190. Alternatively, while either the light absorbing or light returning particles are swept into the viewing area of the cell, the oppositely charged particles may be "hidden" under the opaque regions of the cell.

In other embodiments, the pixel cell 100 can include a light absorption medium that absorbs incident light within at least two specified wavelength bands, but is substantially transparent to at least a portion of the visible light at wavelengths outside the two specified wavelength bands. The pixel cell 100 also includes a first plurality of light returning particles adapted to selectively return at least one wavelength of light within one of the specified wavelength bands and a second plurality of light returning particles adapted to selectively return at least one wavelength of light within the other specified wavelength band. The first plurality of light returning particles is substantially transparent to at least a portion of the light outside the first specified wavelength band. Similarly, the second plurality of light returning particles is substantially transparent to at least a portion of the light outside the first and second specified wavelength bands. By separately controlling the position of the first plurality of particles and the second plurality of particles within the pixel cell 100, the amount of returned (or absorbed) light in each specified wavelength band can be controlled.

Figure 3:
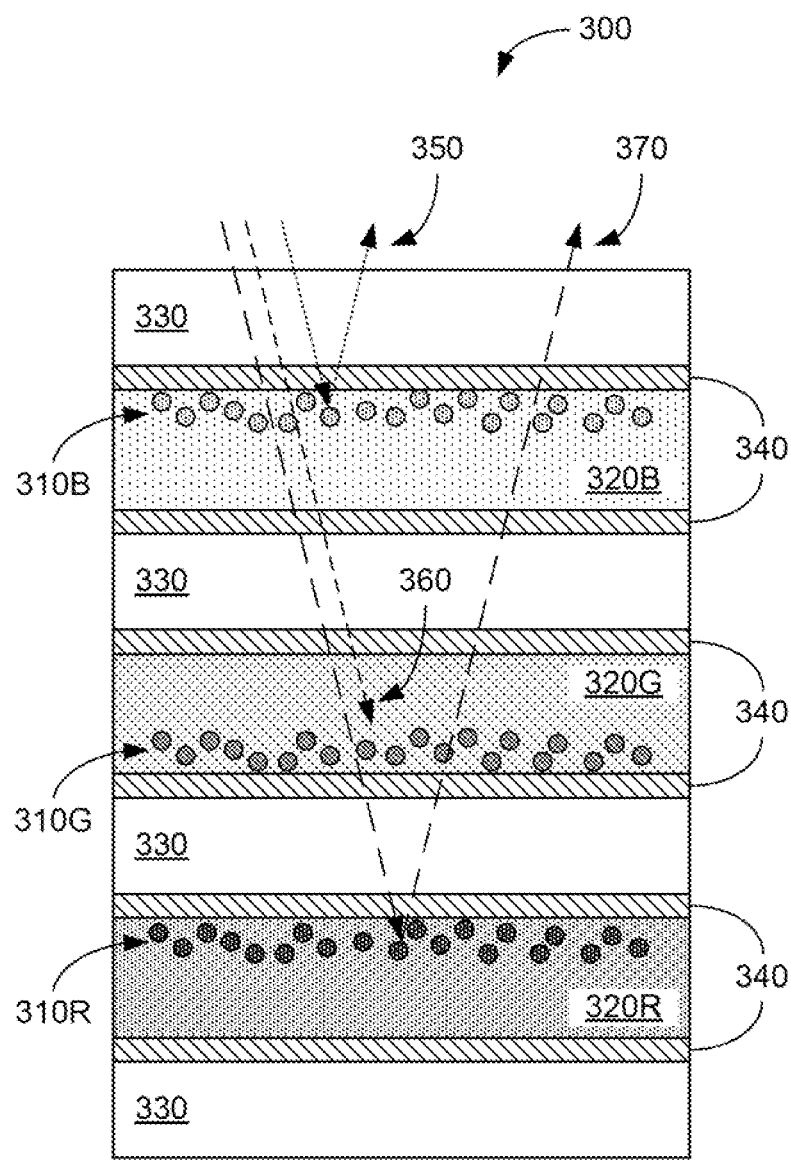
FIG. 3 is a graphical representation of a reflective display pixel including three cells of FIGS. 1 and 2 according to an embodiment of the present invention.

Pixel cells 100, such as those illustrated in FIGS. 1 and 2, can be stacked to provide different colors for reflective displays. FIG. 3 is a graphical representation of a reflective display pixel 300 including three stacked cells. In the embodiment of FIG. 3, a blue pixel cell including a fluid containing light absorption medium 320B capable of absorbing blue light and a plurality of light returning particles 3108 capable of selectively returning one or more wavelengths within the blue light wavelength band is stacked above/before a green pixel cell including a fluid containing a light absorbing medium 320G capable of absorbing green light and light returning particles 310G capable of selectively returning at least one wavelength within the green light wavelength band. The green pixel cell may be referred to as being lower in the stack than the blue pixel cell. Since the blue light has already been reflected or absorbed by the first cell, the wavelength band of the second (green) cell may extend (or overlap) into the wavelength band of the first (blue) cell without adversely affecting the operation of the first cell. In the embodiment of FIG. 3, the absorption mediums are not controlled within the fluid of each cell.

In turn, a red pixel cell including a fluid containing a light absorbing medium 320R capable of absorbing red light and a plurality of light returning particles 310R capable of selectively returning at least one wavelength within the red light wavelength band is stacked below/behind the green pixel cell. The red pixel cell may be referred to as being lower in the stack than the blue and green pixel cells. Since the blue and green light have already been reflected or absorbed by the first and second cells, the wavelength band of the third (red) cell may extend (or overlap) into one or both of the wavelength bands of the first (blue) and second (green) cells. For example, if the pixel comprises three cells, the light absorption medium of the third cell may be capable of broadband absorption.

Pixel architectures containing more or fewer stacked cells are also possible, as are designs with side-by-side sub-pixels containing one or more stacked cells. In other embodiments, the sequencing or ordering of the specified wavelength bands of the cells may differ. In FIG. 3, the stacked pixel cells utilize transparent substrates 330 in common with adjacent cells and transparent electrodes 340. It should be noted that the substrate at the bottom of the stack need not be transparent because light is not being transmitted to another cell lower in the stack. In other embodiments, pixel cells may include individual transparent substrates such as depicted in FIGS. 1 and 2.

As illustrated in FIG. 3, light 350, 360, and 370 enters the reflective display pixel 300 at the viewing surface. Upon encountering the first (blue) pixel cell, incident light 350 within the blue wavelength range is either absorbed by the light absorption medium containing fluid 320B or returned by the light returning particles 310B, based upon the positioning of the particles. In the exemplary embodiment of FIG. 3, the light returning particles 310B have been moved toward the viewing surface so that incident blue light is returned before substantial absorption can occur. In the case of reflective particles, light is reflected by diffractive or scattering effects. It should be noted that blue light that is not returned by the particles 310B, is absorbed by the absorption medium and is not transmitted to subsequent pixel cells.

Light having wavelengths in at least a portion of the visible spectrum outside the specified blue wavelength range (e.g., green light 360 and red light 370) are substantially transmitted through the blue pixel cell to the second (green) pixel cell. The light absorption/return process is repeated to the incident light in the lower cells. In the embodiment of FIG. 3, green and red light (360 and 370) enter the green pixel cell. Because the light returning particles 310G have been moved away from the viewing surface, light 360 with wavelengths within the specified wavelength band is absorbed by the light absorbing medium contained in the fluid 320G before it can be reflected back toward the viewer or passes through the second pixel cell. Red light 370 in at least a portion of the visual spectrum outside the specified wavelength band of the first and second cells is substantially transmitted to subsequent (or lower) pixel cells. Because blue light in the specified wavelength band of the first (blue) pixel cell has been either absorbed or returned, the second (green) cell is not exposed to the blue light. Thus, even if the specified band for the second pixel cell extends into the specified band of the first pixel cell, it does not impact operation of the reflective display pixel.

When the remaining light that has passed through the first and second pixel cells (e.g., red light 370) reaches the third (red) pixel cell, the light absorption/return process is repeated. In the exemplary embodiment of FIG. 3, the light returning particles 310R have been moved toward the viewing surface so that incident light 370 is substantially returned before absorption by the light absorbing medium contained in the fluid 320R can occur. Light not within any of the three specified wavelength bands corresponding to the three pixel cells is allowed to pass through to any subsequent (or lower) cells. Alternatively, the light absorbing medium may be capable of broadband absorption, and thus absorb any remaining wavelengths before they pass through the third pixel cell. It should be noted that, in addition to ambient light, a frontlight can be used to replace or augment ambient light.

Other types of light returning particles 110 can include luminescent particles that absorb light within a range of wavelengths and then emit light in a different or similar range of wavelengths. In some embodiments, emission is within the specified wavelength band, while in other embodiments, emission is outside the specified band. Luminescent particles can include, but are not limited to, colloidal semiconducting nanoparticles with or without dopants, such as rare-earth ions, or pigment particles containing luminescent dye molecules, oligomers, or polymers. Incident light is absorbed at one or more specified wavelengths and then light is emitted at a somewhat longer wavelength, depending on the material's Stokes shift. In this way, luminescent particles return to the viewer a significant fraction of the light that would otherwise be absorbed by the light absorption medium of a pixel cell 100. Semiconducting nanoparticles, for example, can have emission spectra with a full-wave at half-maximum (FWHM) of 25 nm. Compressing the available light into narrow bands produces saturated colors that can be used as a basis set to provide a larger color gamut volume. Desirable choices for the emission wavelengths may be bands close to Thornton's prime colors (e.g., approximately 445, 536, and 604 nm). See, e.g., "Luminosity and color-rendering capability of white light", William A. Thornton, J. Opt. Soc. Am. 61(9):1155-1163 (1971).

The contrast ratio between the absorbing and returning states can be improved if the absorption band of the light absorption medium overlaps strongly with the emission band of the luminescent particles, in addition to their absorption band. The light emission can be weighted toward the viewer by proper design of the particles. In addition, if the Stokes shift is small some of the emitted light can be re-absorbed by other particles and then re-emitted in a different direction. If the efficiency of the luminescent particles is high, the absorption length of the fluid containing the light absorbing medium is long compared to the mean distance before particle absorption, and the Stokes shift is small, a large fraction of the incident light can be returned from the cell in the form of luminescence. The mean distance before particle absorption is decreased by increased particle density, which is ultimately limited by the density that can be achieved without permanent aggregation. As with reflective particles, charge, ligands, and/or encapsulation can be used to prevent aggregation.

In some cases, the useful packing density may be limited by interparticle Förster exchange. Förster exchange results in the transfer of an exciton from one particle to another via the exchange of a virtual photon. This can result in concentration quenching of the luminescence efficiency because it allows excitons to migrate to defective particles before radiatively recombining. As it is a dipole-dipole interaction, Förster exchange decays approximately as the inverse of the sixth power of the lumophore separation ($1/d^6$). Typically, this limits separations to no less than a few nanometers. Again, smaller separations can be prevented through the use of charge, ligands or encapsulation. Interparticle Förster exchange can also be minimized by increasing the Stokes shift of the lumophores so that the overlap integral of their absorption and emission is decreased. In one embodiment, among others, increased Stokes shifts can be obtained, for example, by using doped semiconducting nanocrystals.

The operation of an exemplary pixel cell 100 including a plurality of light returning particles 110, such as luminescent particles, can be explained with respect to FIGS. 1 and 2. When the light returning particles 110 (e.g., luminescent particles) are moved away from the viewing surface of the cell (as illustrated in FIG. 1), most or all of the incident light 150 at wavelengths within the specified wavelength band of the light absorbing medium is absorbed, while light 160 having wavelengths outside the specified wavelength band are substantially transmitted through the pixel cell. When the light returning particles 110 (e.g., luminescent particles) are moved toward the viewing surface (as illustrated in FIG. 2), light at wavelengths within their specified wavelength absorption band, which may be similar to the specified absorption band of the light absorbing medium in the fluid 120, that reach the particles 110 is absorbed and then light 250 is emitted within a somewhat longer wavelength band toward the viewer while light 160 outside the specified wavelength band continues to pass through the pixel cell 100. By controlling the position of the light returning particles 110 within the fluid, the amount of returned light 250 can be controlled.

As described with respect to FIG. 3, pixel cells utilizing luminescent particles can be stacked to provide different colors. For example, a blue pixel cell can be stacked above a green pixel cell which is, in turn, stacked above a red pixel cell. The absorption spectra of some lumophores, such as colloidal semiconducting nanoparticles, are not limited to one narrow wavelength band and exhibit significant absorption extending to shorter wavelengths. In this case, arrangement of the stacked cells in the order described, with the blue absorbing layer closest to the viewing surface, can be beneficial. In the embodiment of FIG. 3, ultraviolet (UV) light may be utilized by the luminescent particles, in addition to the ambient blue light, to produce the emitted blue light and thereby boost the pixel brightness. It also does not then matter if the green pixel cell has an absorption tail extending into the blue wavelength band because the blue light is absorbed before reaching the green pixel cell. Similarly, a short wavelength tail in the absorption spectrum of the red pixel cell is not problematic because green or blue light is absorbed or returned before reaching this layer. Pixel architectures containing more or fewer stacked layers are also possible, as are designs with side-by-side sub-pixels. The display contrast should be quite good because both very dark absorptive states and highly bright emissive states are possible. Another advantage is that the color gamut can be improved if luminescent particles with narrow emission spectra are used.

In other embodiments, the fluid can contain a light returning medium capable of selectively returning one or more wavelengths of light within the specified wavelength band. For example, fluids containing luminescent dyes, oligomers, polymers, or dendrimers may be used to absorb light within the wavelength band and then emit light in a specified wavelength. Alternatively, the fluid can incorporate pigment particles containing luminescent dyes, oligomers, polymers, or dendrimers where the position of the pigment particles within the fluid is not actively controlled. Wavelengths of light in at least a portion of the spectrum outside the specified band are allowed to pass through the pixel cell. The light absorbing medium contained in the fluid is a plurality of light absorbing particles that absorb light in at least the specified band. The position of the light absorbing particles is controlled so that, when moved toward the viewer (or across the viewing area), light within the specified wavelength band is absorbed by the light absorbing particles. As the light absorbing particles are moved away from the viewer, more light within the specified band is reflected and less light is absorbed.

In other embodiments, the pixel cell 100 can include a light returning medium that returns at least a wavelength of light within each of two specified wavelength bands, but which is substantially transparent to at least a portion of the light outside the first and second specified wavelength bands. The pixel cell 100 also includes a first plurality of light absorbing particles capable of absorbing incident light in at least the first specified wavelength band and a second plurality of light returning particles capable of absorbing incident light in at least the second specified wavelength band. The first plurality of light absorbing particles is substantially transparent to at least a portion of light outside the first specified wavelength band and the second plurality of light returning particles is substantially transparent to at least a portion of light outside the second specified wavelength band. By separately controlling the position of the first plurality of particles and the second plurality of particles within the pixel cell 100, the amount of returned (or absorbed) light in each specified wavelength band can be controlled.

Therefore, having thus described the invention, at least the following is claimed:

1. A reflective display pixel for modulating a return of incident visible light in at least one specified wavelength band, comprising:
   a cell to selectively return light in the at least one specified wavelength band, the cell comprising a fluid containing:
      a light absorbing medium to absorb the incident visible light in the at least one specified wavelength band and being substantially transparent to at least a portion of the incident visible light in any wavelength band outside the at least one specified wavelength band;
      a light returning medium to selectively return at least a portion of the incident visible light within the at least one specified wavelength band and being substantially transparent to at least a portion of the incident visible light in any wavelength band outside the at least one specified wavelength band; and
      where at least one of the light absorbing medium and the light returning medium is controllable to move up and down between positions within the fluid to adjust an amount of the incident visible light returned within the at least one specified wavelength band, the positions including a first position closer to a viewing surface of the cell, and a second position farther away from the viewing surface.

2. The reflective display pixel of claim 1, wherein the light returning medium includes a plurality of light returning particles to selectively return at least a portion of the incident visible light within the at least one specified wavelength band.

3. The reflective display pixel of claim 2, wherein the light returning particles include cholesteric flake particles.

4. The reflective display pixel of claim 1, wherein the light returning medium includes a luminescent dye capable of selectively emitting at least a portion of light within the at least one specified wavelength band.

5. The reflective display pixel of claim 1, wherein the light absorbing medium is further capable of absorbing the incident visible light in at least a second specified wavelength band; and
   the light returning medium is further capable of selectively returning at least a portion of the light within the second specified wavelength band.

6. The reflective display pixel of claim 5, wherein the light returning medium includes a plurality of light returning particles capable of selectively returning at least a portion of light within the second specified wavelength band, the light returning particles positioned to control the amount of light returned within the second specified wavelength band.

7. A reflective display comprising the reflective display pixel of claim 1.

8. The reflective display pixel of claim 1, further comprising a stack of cells including the cell to selectively return light in the at least one specified wavelength band, wherein the light absorbing medium and the light returning medium are substantially transparent to at least a portion of the incident visible light in any of specified wavelength bands for one or more cells lower in the stack.

9. A reflective display pixel for modulating a return of incident visible light in specified wavelength bands, comprising:
   a stack of cells each to selectively return light in a corresponding at least one of the specified wavelength bands, wherein a first of the cells comprises a fluid containing:
      a light absorbing medium to absorb the incident visible light in the at least one specified wavelength band for the first cell, and being substantially transparent to at least a portion of the incident visible light in any of the specified wavelength bands for one or more cells lower in the stack;
      a light returning medium to selectively return at least a portion of the incident visible light within the at least one specified wavelength band for the first cell, and being substantially transparent to at least a portion of the incident visible light in any of the specified wavelength bands for the one or more cells lower in the stack, wherein the light returning medium includes a plurality of light returning particles selected from the group consisting of:
         Bragg scattering particles comprising a multilayer stack of dielectric layers with different refractive indices;
         plasmonic particles; and
         luminescent particles capable of selectively emitting at least a portion of light within the at least one specified wavelength band for the first cell; and
      where at least one of the light absorbing medium and the light returning medium is capable of controllable movement between positions within the first cell to adjust an amount of the incident visible light returned within the at least one specified wavelength band for the first cell.

10. The reflective display pixel of claim 9, wherein the light absorbing medium in the first cell includes a dye capable of selectively absorbing the incident visible light in at least a portion of the at least one specified wavelength band for the first cell.

11. A reflective display pixel for modulating a return of incident visible light in specified wavelength bands, comprising:
   a stack of cells each to selectively return light in a corresponding at least one of the specified wavelength bands, wherein a first of the cells comprises a fluid containing:
      a light absorbing medium to absorb the incident visible light in the at least one specified wavelength band for the first cell, and being substantially transparent to at least a portion of the incident visible light in any of the specified wavelength bands for one or more cells lower in the stack, wherein the light absorbing medium includes a plurality of light absorbing particles, the light absorbing particles capable of selectively absorbing the incident visible light in at least a portion of the at least one specified wavelength band for the first cell;
      a light returning medium to selectively return at least a portion of the incident visible light within the at least one specified wavelength band for the first cell, and being substantially transparent to at least a portion of the incident visible light in any of the specified wavelength bands for the one or more cells lower in the stack; and
      where at least one of the light absorbing medium and the light returning medium is capable of controllable movement between positions within the first cell to adjust an amount of the incident visible light returned within the at least one specified wavelength band for the first cell.

12. The reflective display pixel of claim 11, wherein the light absorbing particles include plasmonic particles.

13. The reflective display pixel of claim 11, wherein the light absorbing particles include pigment particles.

14. A reflective display pixel for modulating a return of incident visible light, comprising:

a stack of cells, wherein a first of the cells comprises a fluid containing:
- a light absorbing medium to absorb the incident visible light in at least one specified wavelength band for the first cell, and being substantially transparent to at least a portion of the incident visible light in any of specified wavelength bands for one or more cells lower in the stack;
- a light returning medium to selectively return at least a portion of the incident visible light outside the at least one specified wavelength band for the first cell, and being substantially transparent to at least a portion of the incident visible light in any of the specified wavelength bands for the one or more cells lower in the stack; and
- where at least one of the light absorbing medium and the light returning medium is controllable to move up and down between positions within the fluid to adjust an amount of the incident visible light returned for the first cell, the positions including a first position closer to a viewing surface of the first cell, and a second position farther away from the viewing surface of the first cell.

* * * * *